US008254486B2

(12) United States Patent
Shi et al.

(10) Patent No.: US 8,254,486 B2
(45) Date of Patent: Aug. 28, 2012

(54) UNIFIED CLOSED LOOP SU/MU-MIMO SIGNALING AND CODEBOOK DESIGN

(75) Inventors: Jun Shi, San Diego, CA (US); Qinghua Li, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1140 days.

(21) Appl. No.: 11/904,867

(22) Filed: Sep. 28, 2007

(65) Prior Publication Data

US 2009/0086842 A1    Apr. 2, 2009

(51) Int. Cl.
*H04B 7/04* (2006.01)

(52) U.S. Cl. .......................................... 375/267; 455/69

(58) Field of Classification Search .................. 375/141, 375/144, 148, 260, 267; 370/208, 335, 337, 370/342, 344, 347; 455/24, 511, 513, 526, 455/69

See application file for complete search history.

(56) References Cited

U.S. PATENT DOCUMENTS

| 2007/0183380 A1* | 8/2007 | Rensburg et al. | 370/338 |
| 2008/0032630 A1* | 2/2008 | Kim et al. | 455/45 |
| 2008/0132281 A1* | 6/2008 | Kim et al. | 455/562.1 |

* cited by examiner

*Primary Examiner* — Young T. Tse
(74) *Attorney, Agent, or Firm* — Kacvinsky Daisak, PLLC

(57) ABSTRACT

A multi-resolution codebook is used to provide quantization for channel related information in a wireless network that supports both single-user MIMO and multi-user MIMO. The multi-resolution codebook may include a higher resolution "fine" codebook for use with MU-MIMO subscriber stations and a lower resolution "coarse" codebook for use with SU-MIMO subscriber stations. A tracking codebook may also be used to provide quantization for updates to channel related information. In at least one embodiment, the tracking codebook includes a number of unit vectors (or orthogonal matrices) disposed upon a sphere cap.

15 Claims, 9 Drawing Sheets

UNIFIED CLOSED LOOP SU/MU-MIMO SIGNALING AND CODEBOOK DESIGN

TECHNICAL FIELD

The invention relates generally to wireless communications and, more particularly, to techniques for implementing closed loop MIMO in systems that include both single user MIMO subscriber stations and multi-user MIMO subscriber stations.

BACKGROUND OF THE INVENTION

Wireless communication systems are being developed that will allow both single-user MIMO subscriber stations and multi-user MIMO subscriber stations to operate within a common network region. Techniques are needed to support efficient operation of such systems.

DETAILED DESCRIPTION

Figure 1:
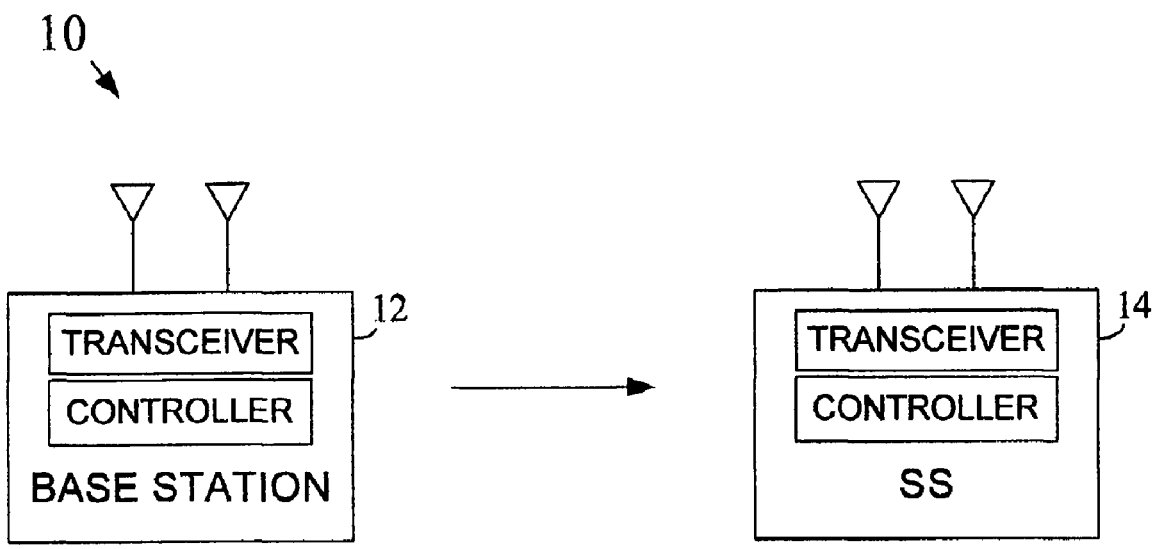
FIG. 1 is a block diagram illustrating an example SU-MIMO wireless communication arrangement using closed loop MIMO in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Multiple input, multiple output (MIMO) is a wireless communication technique where both a transmitting device and a receiving device utilize multiple antennas to support a wireless communication link between the devices (i.e., a MIMO channel). MIMO may be practiced as either an open loop or a closed loop technique. In open loop MIMO, the transmitting device has no knowledge of the current state of the MIMO channel before data is transmitted to the receiving device. In closed loop MIMO, on the other hand, the transmitting device obtains information about the MIMO channel and uses that information to pre-code data before transmission to tailor the data to the channel. The information that is obtained by the transmitting device may include one or more beam forming vectors (e.g., singular vectors, etc.) that allow the transmitting device to appropriately steer transmitted signals through the MIMO channel.

In one possible approach, the transmitting device obtains the channel related information as feedback from the receiving device. That is, the transmitting device may first transmit channel sounding signals to the receiving device that allow the receiving device to estimate the downlink channel to generate a channel matrix. The receiving device may then process this channel matrix to generate beam forming information (e.g., one or more beam forming vectors) to be used by the transmitting device. The receiving device may use, for example, a matrix decomposition technique (e.g., singular value decomposition (SVD), etc.) to generate the beam forming information. The beam forming information may then be fed back to the transmitting device for use in pre-coding a subsequent transmit signal. In multi-carrier systems, such as orthogonal frequency division multiplexing (OFDM) systems, multiple beam forming vectors may be fed back to support the multiple sub-carriers of the system.

As will be appreciated, the amount of information to be fed back in a closed loop MIMO arrangement can be very large. This feedback information represents overhead in the underlying system which can have a direct impact on the overall data throughput that can be achieved in the system. One technique that may be used to limit the amount of feedback in a closed loop MIMO system is vector quantization. Vector quantization defines a finite number of vectors (i.e., a codebook) that will used as feedback in the system. Each of the vectors in the codebook has an index number associated with it for use in identifying the vector. When a receiving device has generated a beam forming vector to be fed back to a transmitting device, it may first determine which vector (or code word) in the codebook most closely resembles the actual beam forming vector. The index of the selected vector is then fed back to the transmitting device. The transmitting device knows the codebook vector that is associated with the fed back index and uses that vector to perform transmit pre-coding. The index is significantly smaller in size than the original beam forming vector and thus reduces the amount of information to be fed back significantly. Matrix quantization may also be used.

FIG. 1 is a block diagram illustrating an example wireless communication arrangement 10 using closed loop MIMO in accordance with an embodiment of the present invention. The arrangement 10 is implementing a technique known as single user MIMO (SU-MIMO). In SU-MIMO, a base station 12 communicates with a single subscriber station 14 at a time, through a corresponding MIMO channel. As described previously, the base station 12 may first transmit channel sounding to the subscriber station 14 through the channel. The subscriber station 14 then uses the channel sounding to generate a channel matrix and beam forming information (e.g., one or more beam forming vectors). The beam forming information may then be fed back to the base station 12 for use in performing pre-coding in a subsequent data transmission. As described previously, vector quantization techniques may be used to quantize the beam forming information before it is transmitted back.

As shown, the base station 12 and the subscriber station 14 may each include a wireless transceiver to receive wireless signals from the MIMO channel and transmit wireless signals into the MIMO channel. The base station 12 and the subscriber station 14 may each also include a controller to perform various baseband control functions for the respective devices. The controllers may each be implemented using, for example, one or more digital processing devices. Any type of digital processing devices may be used including, for example, general purpose microprocessors, digital signal processors (DSP), reduced instruction set computers (RISC), complex instruction set computers (CISC), field programmable gate arrays (FPGA), application specific integrated circuits (ASIC), microcontrollers, and/or others, including combinations of the above.

Figure 2:
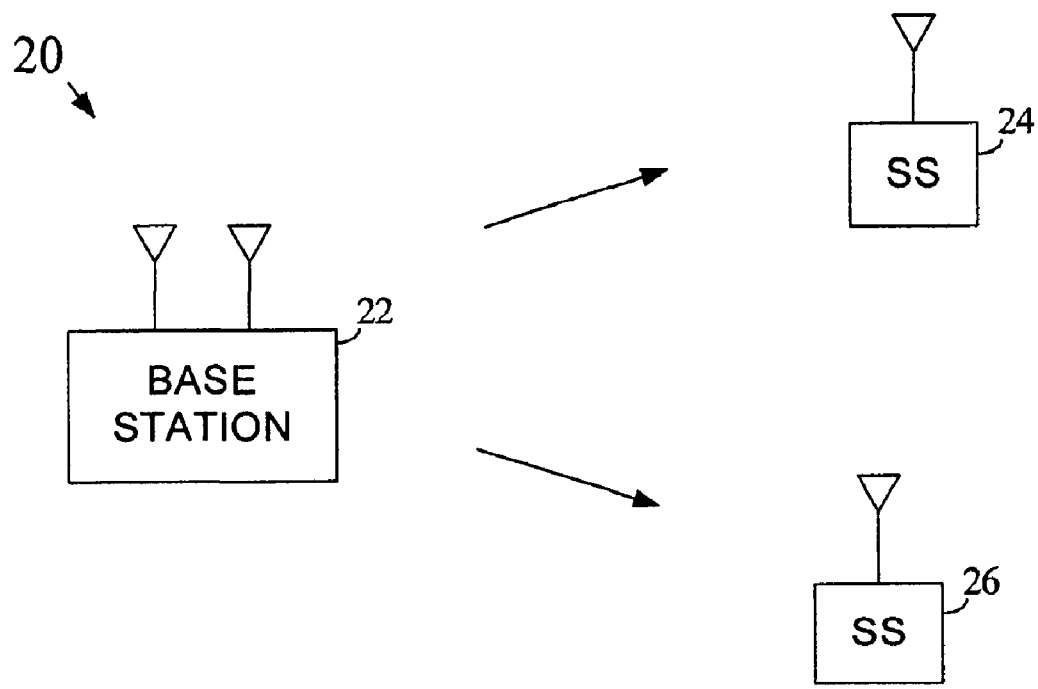
FIG. 2 is a block diagram illustrating an example MU-MIMO wireless communication arrangement using closed loop MIMO in accordance with an embodiment of the present invention.

In another technique, known as multiple-user MIMO (MU-MIMO), a base station may communicate with multiple subscriber stations at the same time and within the same frequency band. FIG. 2 is a block diagram illustrating an example wireless communication arrangement 20 using closed loop, MU-MIMO in accordance with an embodiment of the present invention. As shown, a base station 22 is transmitting to both subscriber station 24 and subscriber station 26 at the same time, in the same frequency band. To allow this, MU-MIMO makes use of a concept known as spatial division multiple access (SDMA). That is, the base station 22 selects subscriber stations that have roughly orthogonal beam forming vectors for simultaneous communication.

To implement SDMA, the base station 22 needs to obtain channel related information (e.g., beam forming vectors, etc.) from the subscriber stations. In one approach, the base station 22 may collect channel related information from a large number of subscriber stations in a corresponding cell and then analyze the information to select a smaller number of subscriber stations for simultaneous communication. The base station 22 may then use the channel related information to perform pre-coding to simultaneously transmit to the selected subscriber stations. The channel related information may be obtained from the subscriber stations in a manner similar to that described for SU-MIMO. That is, the base station 22 can first transmit channel sounding to the subscriber stations in the cell and the subscriber stations can then use the received channel sounding to generate beam forming vectors. The beam forming vectors may then be fed back to the base station from the individual subscriber stations at appropriate times. As described previously, vector quantization techniques may be used to quantize the beam forming information before it is fed back to the base station 22. Although illustrated with two subscriber stations 24, 26 in FIG. 2, it should be understood that MU-MIMO techniques may be used to concurrently transmit to any number of subscriber stations concurrently, as long as a sufficient number of subscriber stations with roughly orthogonal beam forming vectors can be found. In addition, each subscriber station may have more than one antenna and receive more than one spatial stream. As in FIG. 1, the base station 22 and the subscriber stations 24, 26 of FIG. 2 may each include a wireless transceiver and a controller.

In some wireless networks, both SU-MIMO and MU-MIMO may be supported within the same cell. In one aspect of the present invention, a multi-resolution codebook is provided that can service both SU-MIMO subscriber stations and MU-MIMO subscriber stations in the same cell. The multi-resolution codebook may include a higher resolution "fine" codebook for use with MU-MIMO subscriber stations and a lower resolution "coarse" codebook for use with SU-MIMO subscriber stations. That is, the MU-MIMO subscriber stations within the cell will use the fine codebook to quantize channel related information (e.g., beam forming vectors, etc.) to be fed back to the base station and the SU-MIMO subscriber stations within the cell will use the coarse codebook to quantize channel related information to be fed back to the base station. The base station can then use the channel related information that it receives from the MU-MIMO subscriber stations and the SU-MIMO subscriber stations to perform pre-coding for the subscriber stations. The multi-resolution codebook technique may be used in wireless systems practicing both time division duplexing (TDD) and frequency division duplexing (FDD).

In at least one embodiment, the coarse codebook may be a subset of the fine codebook. For example, in one implementation, the fine codebook includes a set of 256 complex unit vectors and the coarse codebook includes the first 64 vectors of the fine codebook. In general, MU-MIMO operation is much more sensitive to variations and/or errors in channel information than is SU-MIMO operation. Thus, more detailed channel information (i.e., less quantization error, etc.) is generally required for MU-MIMO operation. The fine codebook is designed to provide the level of codebook granularity that is needed for MU-MIMO operation. The coarse codebook provides a level of granularity that is acceptable for SU-MIMO operation. The indices of the code words within the multi-resolution codebook may be the information that is actually fed back to the base station. Techniques for generating and using multi-resolution codebooks are described herein. Techniques for generating and using a tracking codebook to update MU-MIMO channel information within a base station are also provided. In addition, a subscriber station selection technique for use in a network using the multi-resolution codebook is also described. For some cases (e.g., the quantization of beam forming direction), the code words may be vectors with unit norm when a single spatial stream is sent per subscriber station. Additionally, the code words may be orthogonal matrices where the columns of each matrix are orthogonal and have unit norm. When unit and orthogonal codebooks are used, the magnitude information (e.g., the norm of the channel vector) other than direction information may not be quantized.

Figure 3:
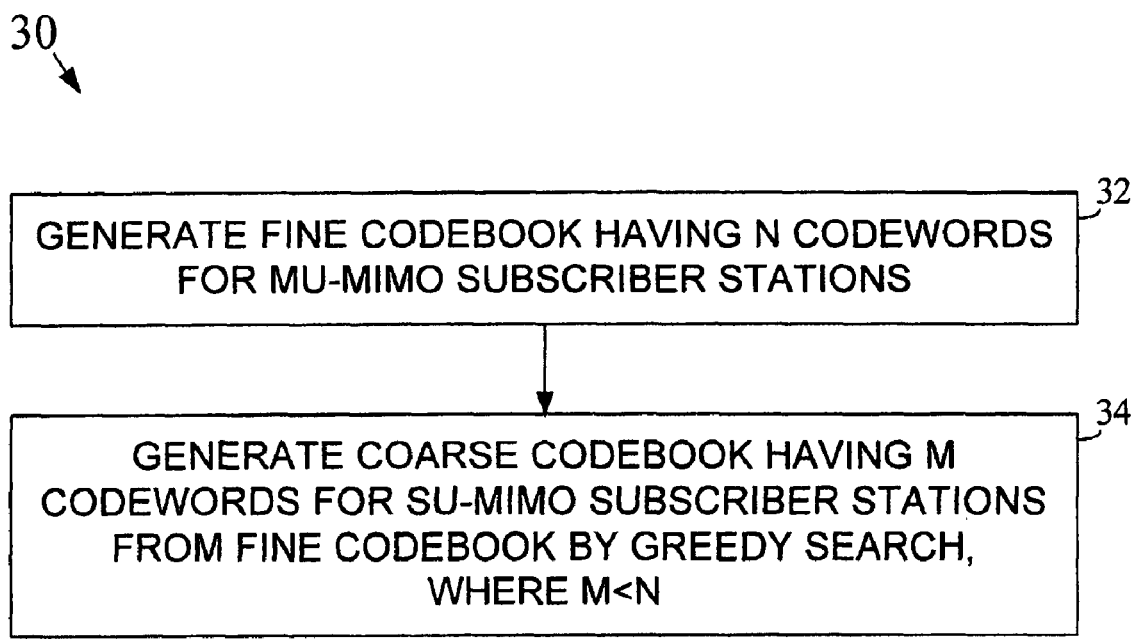
FIG. 3 is a flowchart illustrating an example method for generating a multi-resolution codebook in accordance with an embodiment of the present invention.

FIG. 3 is a flowchart illustrating an example method 30 for use in generating a multi-resolution codebook in accordance with an embodiment of the present invention. First, a fine codebook having N code words is generated for the MU-MIMO subscriber stations (block 32). Then, a coarse codebook having M code words is generated for the SU-MIMO subscriber stations from the fine codebook, by greedy search (block 34). M and N are integers and the value of M is less than the value of N. In at least one embodiment, the fine codebook is generated using the well known Linde-Buzo-Gray (LBG) algorithm. To implement the LBG algorithm, a random set of N vectors may first be generated and used as initial code words. In some cases, the vectors may be of unit norm. Training sequences are then generated and used to obtain the Voronoi regions of the initial code words. A non-linear optimization procedure may then be used to compute the centroids of the Voronoi regions. Different distance metrics between two code words (e.g., angle between two vectors, inner product, Euclidean distance, chordal distance, the loss of signal to interference plus noise ratio, the loss of channel capacity, etc.) may be used to compute the Voronoi regions and centroids. The computed centroids are next taken as new code words. New training sequences are then generated to obtain new Voronoi regions for the new code words. The process then iterates until a predetermined convergence condition is met. The resulting fine codebook may have the form: $C=\{V_i, i=1, \ldots, N\}$ where $V_i$ are the code words. In other embodiments, other codebook searching algorithms may be used to generate the fine codebook.

Figure 4:
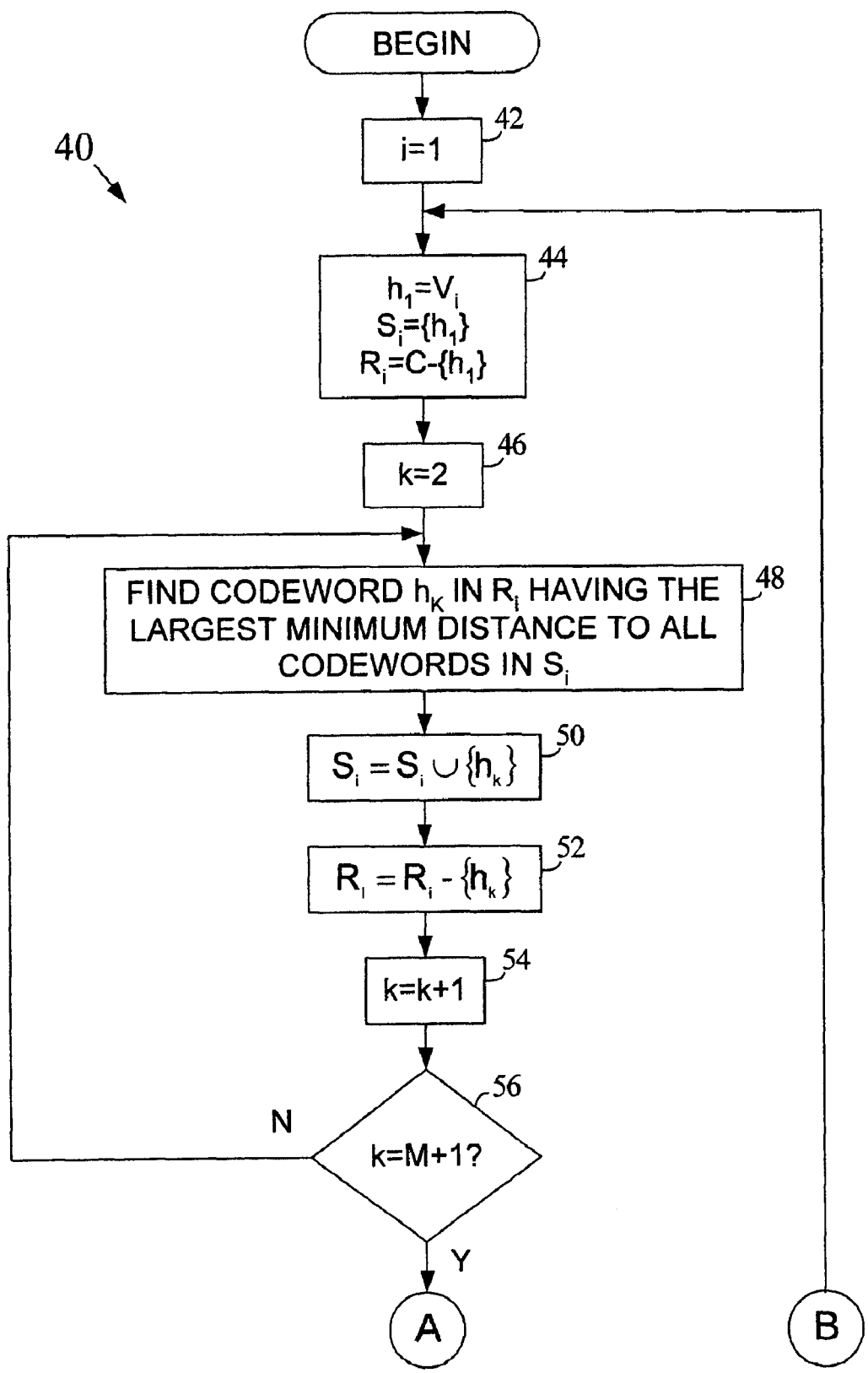
FIGS. 4 and 5 are portions of a flowchart illustrating an example method for generating a coarse codebook for use with SU-MIMO subscriber stations from a fine codebook for use with MU-MIMO subscriber stations in accordance with an embodiment of the present invention.
Figure 5:
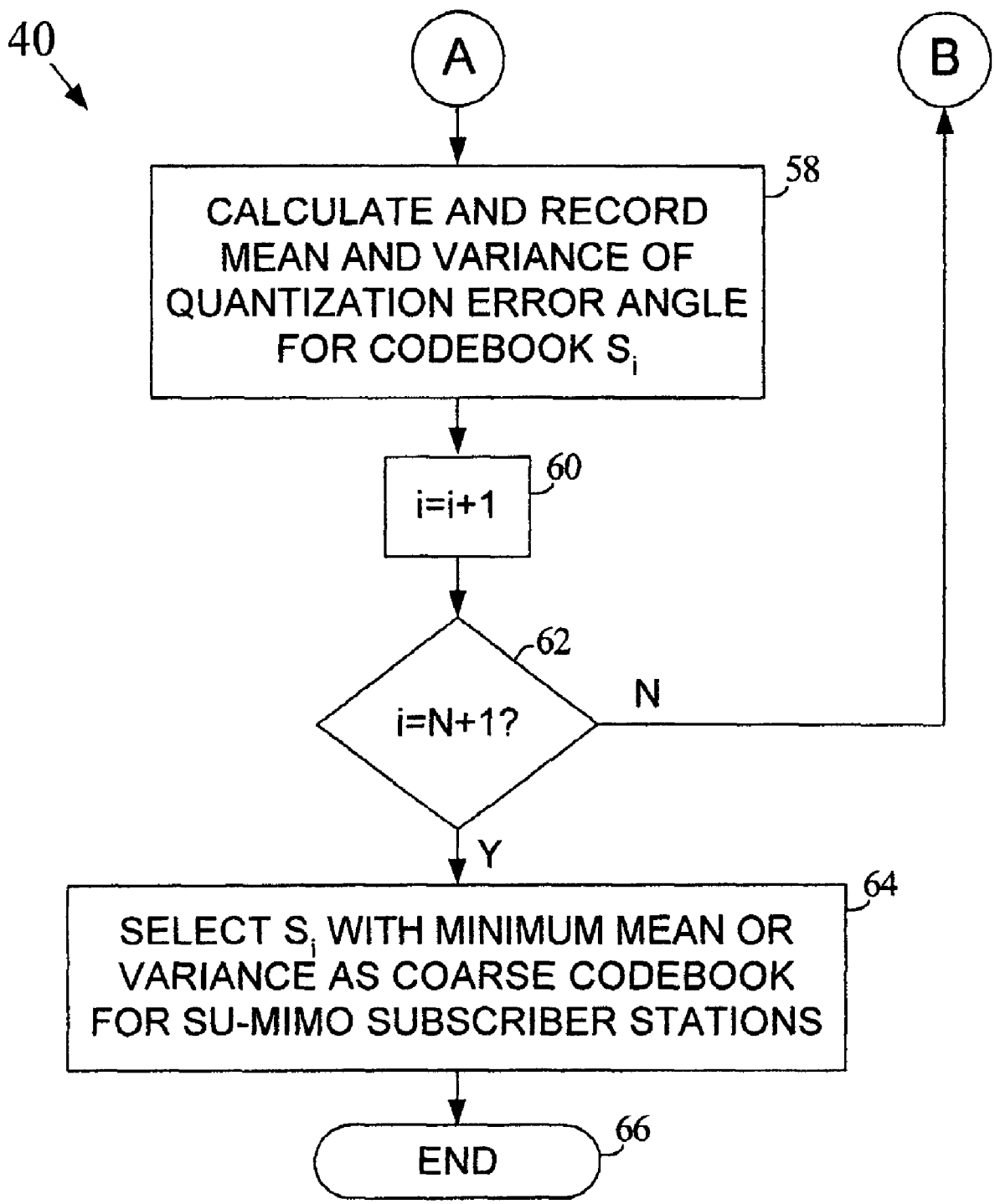

As described above, in one approach, a greedy search procedure may be used to generate the coarse codebook from the fine codebook. FIGS. 4 and 5 are portions of a flowchart illustrating an example method 40 for generating the coarse codebook having M code words from the fine codebook C having N code words in accordance with an embodiment of the present invention. With reference to FIG. 4, the index i, which is the index of the code words in the fine codebook, is first initialized to 1 (block 42). An initial code word $h_1$ of a first candidate coarse codebook $S_1$ is then set to the first code word $V_1$ of the fine codebook (block 44). A set $R_1$ is also defined that includes all of the code words of the fine codebook C other than code word $V_1$. The index k, which is the index of the code words in the coarse codebook, is now initialized to 2 (block 46). The code word $h_2$ in set $R_1$ that has the largest minimum distance to all code words in $S_1$ is next identified (block 48). Codeword $h_2$ is then added to the first candidate coarse codebook $S_1$ (block 50) and is removed from set $R_1$ (block 52). The index k is then incremented by 1 (block 54). When vector code words are being used, the operation of block 48 can find the vector $h_K$ in $R_i$ that has the largest norm in the null space of $S_i$.

It is next determined whether the index k has yet reached a value of M+1, where M is the number of code words that will be in the coarse codebook (block 56). If not (block 56-N), the method 40 may return to block 48 and a next code word $h_3$ is found in $R_1$ that has the largest minimum distance to all code words in $S_1$. The code word $h_3$ is then added to the first candidate coarse codebook $S_1$ (block 50) and removed from set $R_1$ (block 52). The index k is then again incremented (block 54). This process is then repeated until the first candidate coarse codebook $S_1$ has M code words (block 56-Y).

Referring now to FIG. 5, the mean and variance of the quantization error for the first candidate coarse codebook $S_1$ is calculated and recorded (block 58). The quantization error may be measured by the selected distance metric (e.g., angle between two vectors and channel capacity loss). The index i may then be incremented by 1 (block 60). It is then determined whether the index i has yet reached a value of N+1, where N is the number of code words in the fine codebook (block 62). If not (block 62-N), the method 40 may return to block 44 (see FIG. 4) and the initial vector of a second candidate coarse codebook $S_2$ is set to the second code word $V_2$ of the fine codebook C (block 44). A set $R_2$ is also defined to include all elements of the fine codebook C other than the second code word $V_2$. The index k is then again initialized to 2 (block 46). The same procedure is then used to find the remaining code words of the second candidate coarse codebook $S_2$ that was used for the first candidate coarse codebook $S_1$ (blocks 48, 50, 52, 54, and 56). The mean and variance of the quantization error of the second candidate coarse codebook $S_2$ are then calculated and recorded (block 58). This process is then repeated until N candidate coarse codebooks have been generated, each with a different code word of the fine codebook as the initial code word thereof (block 62-Y). At this point, a candidate coarse codebook $S_i$ having a minimum mean or variance is selected from the candidate coarse codebooks as the actual coarse codebook for use with SU-MIMO subscriber stations (block 64). The method 40 may then terminate (block 66).

Figure 6:
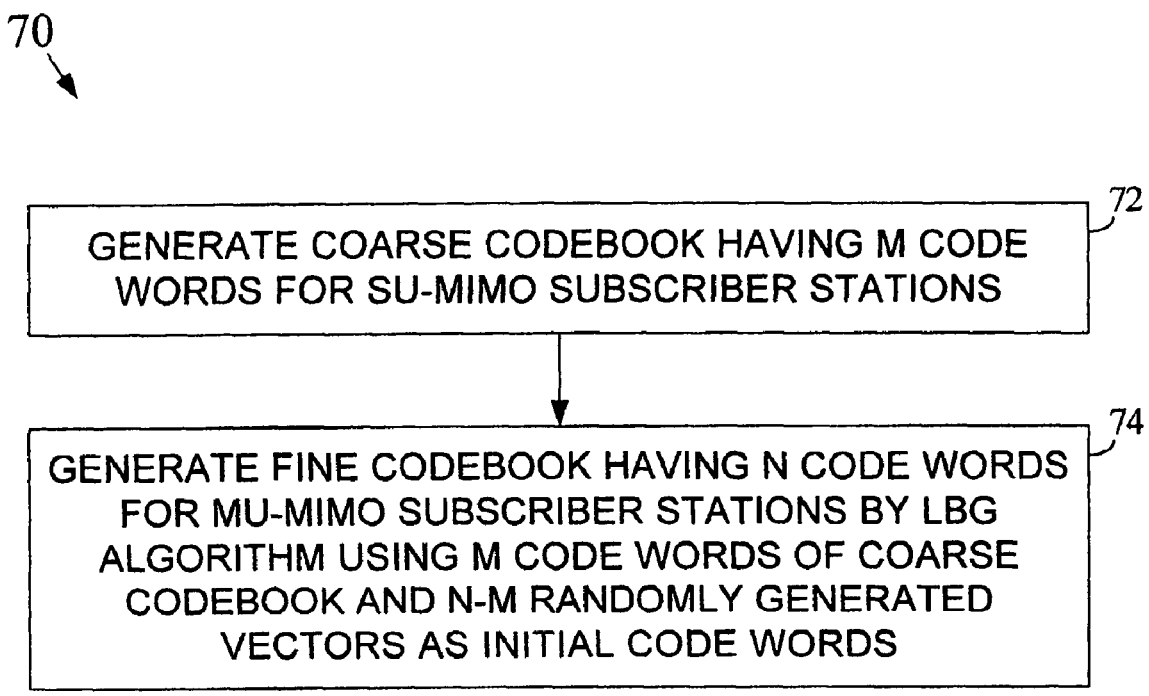
FIG. 6 is a flowchart illustrating an example method for generating a multi-resolution codebook in accordance with another embodiment of the present invention.

FIG. 6 is a flowchart illustrating an example method 70 for generating a multi-resolution codebook in accordance with another embodiment of the present invention. First, a coarse codebook having M code words is generated for use with SU_MIMO subscriber stations (block 72). The coarse codebook may be generated using, for example, the LBG algorithm discussed above (only with M random vectors as initial code words, instead of N). A fine codebook having N code words is then generated for use with MU-MIMO subscriber stations by LBG algorithm using the M code words of the coarse codebook and N−M randomly generated vectors as the initial code words (block 74).

Figure 7:
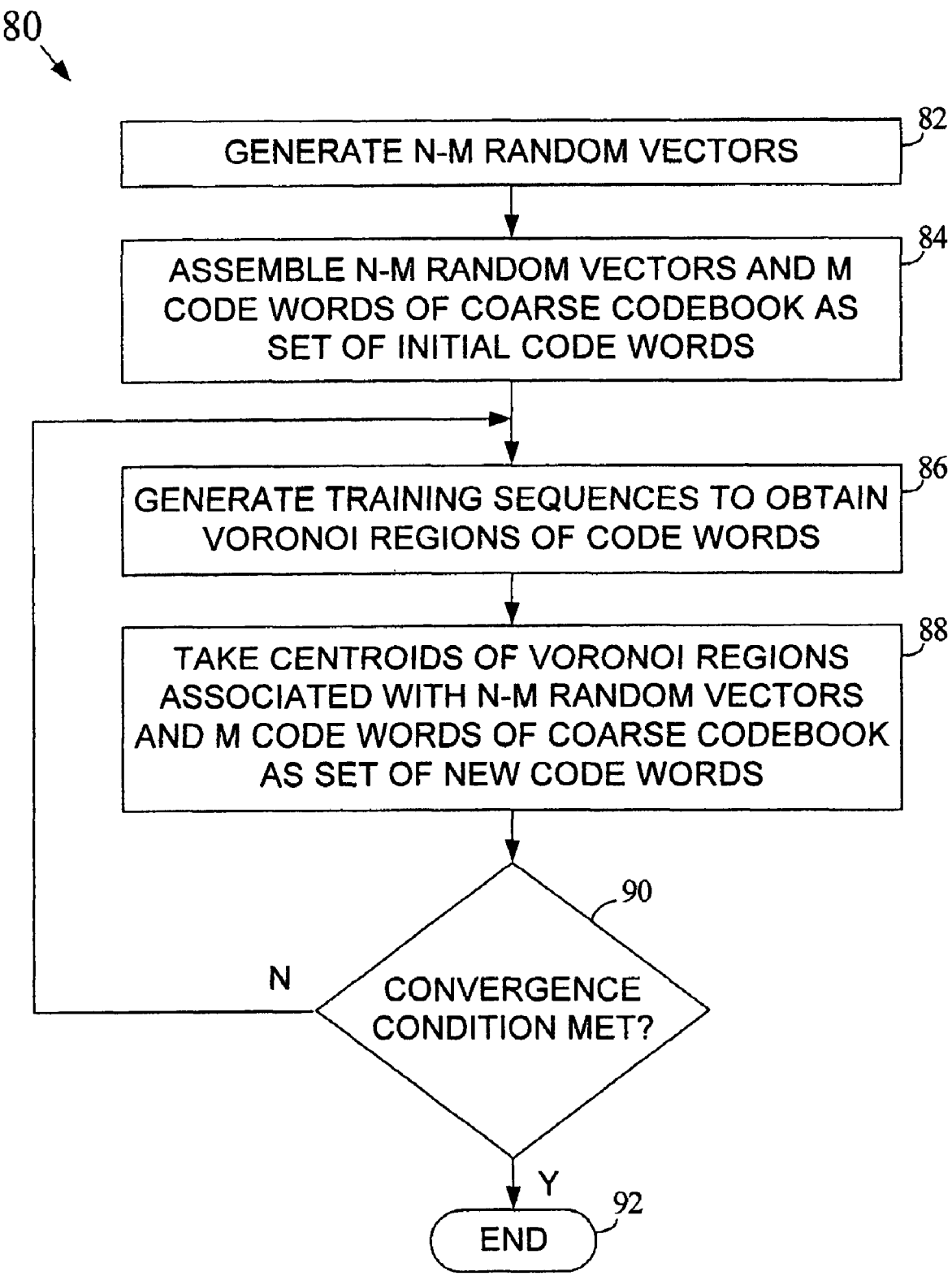
FIG. 7 is a flowchart illustrating an example method for use in generating a fine codebook using M code words of a coarse codebook and N−M randomly generated vectors as initial code words in accordance with an embodiment of the present invention.

FIG. 7 is a flowchart illustrating an example method 80 for use in generating a fine codebook having N code words using the M code words of a coarse codebook in accordance with an embodiment of the present invention. The method 80 may be used within, for example, the method 70 of FIG. 6. As will be described in greater detail, the method 80 uses a modified version of the LBG algorithm. First, N−M random vectors are generated (block 82). The M code words of the coarse codebook and the N−M random vectors are next assembled as an initial set of code words (block 84). Training sequences are next generated to obtain Voronoi regions of the initial code words (block 86). The centroids of the Voronoi regions associated with the N−M random vectors are next computed and the centroids and the M code words of the coarse codebook are taken as a set of new code words (block 88).

It is next determined whether a convergence condition has been met (block 90). If the convergence condition has not been met (block 90-N), the method 80 may return to block 86 and training sequences may again be generated to obtain Voronoi regions of the new code words. The centroids of the new Voronoi regions associated with the N−M random vectors and the M code words of the coarse codebook are then taken as new code words (block 88). This process is repeated until the convergence condition is met (block 90-Y), at which point the method 80 terminates (block 92). The convergence condition may include, for example, the maximum change of the centroid locations being smaller than a predetermined value, a predetermined number of iterations is reached, or others.

Using the fine and coarse codebooks of the present invention to quantize channel related information is relatively straightforward. For example, in at least one embodiment, when a vector x is to be quantized using a codebook V, the metric $abs(x'^*V_i)$ is first computed for all of the code words in the codebook. The code word having the largest metric is then selected as the quantized vector. The same approach may be used for both the fine and the coarse codebooks. In one approach, an index associated with the quantized vector is fed back to the base station for use in pre-coding. In another example, the distance between the input matrix x and the code word matrix $V_i$ is computed, and the index of the code word corresponding to the minimum distance among all code words is fed back.

Figure 10:
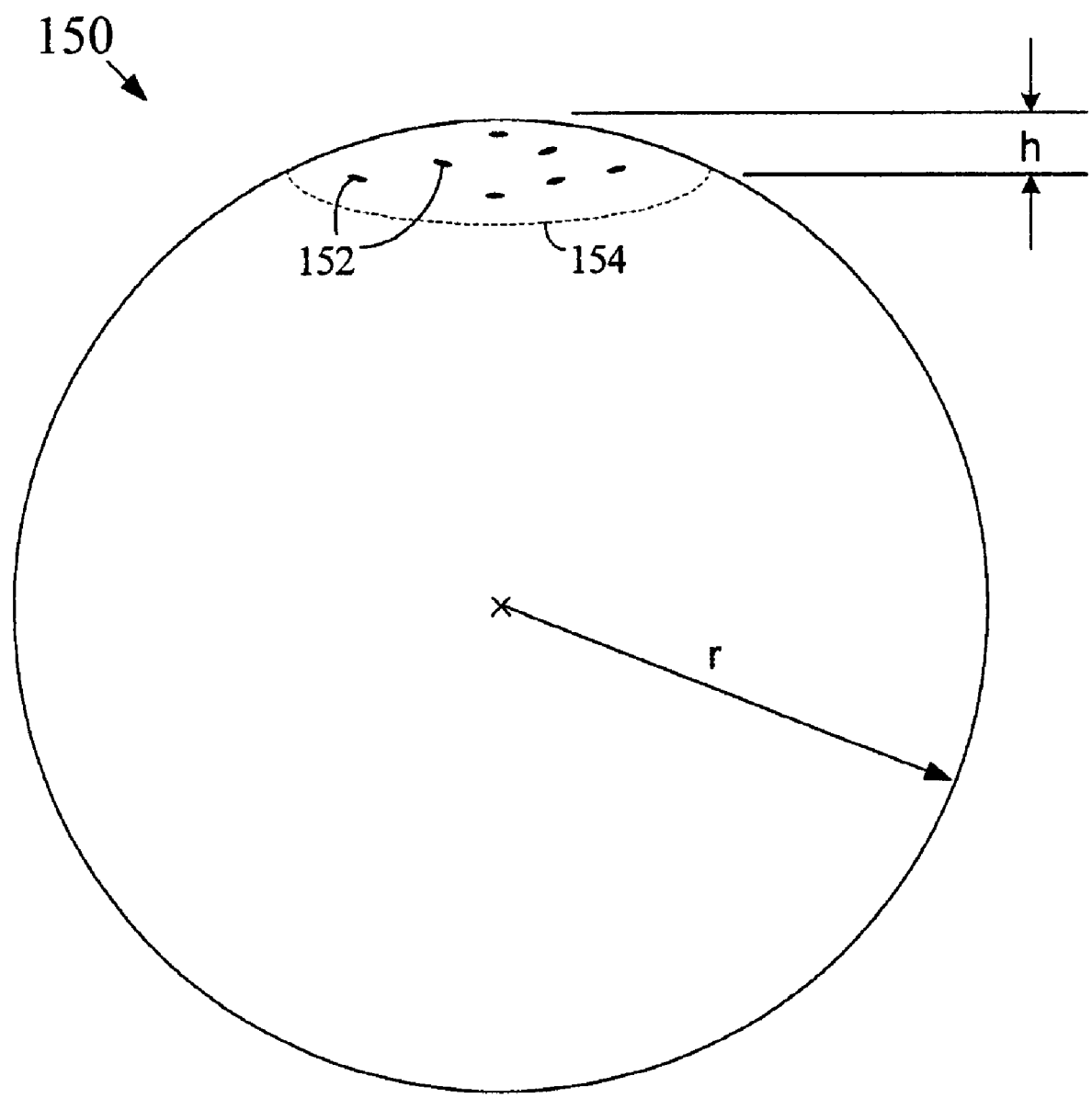
FIG. 10 is a diagram illustrating a tracking codebook that includes unit vectors on a cap of a sphere having a radius r and height h in accordance with an embodiment of the present invention.

During typical network operation, the MU-MIMO subscriber stations may be served across multiple successive frames. These subscriber stations may have to report any channel variation at each of these frames. In at least one embodiment of the present invention, the channel variation is reported by quantizing the variation using a tracking codebook. The subscriber stations using SU-MIMO may also use the tracking codebook to report channel variations, although they may be required to report variations less often than the MU-MIMO stations (e.g., not every frame). In at least one embodiment of the present invention, as illustrated in FIG. 10, a tracking codebook is used that includes unit vectors 152 on a cap 154 of a sphere 150 having a radius of r. The height of the cap 154 is h. Such a tracking codebook may be generated in a similar manner to the initial quantization codebook with the additional constraint that the first entry of the vectors has to be greater than cos α, where cos α=1−h/r, with h being the height of the sphere cap, and r being the radius of the sphere. The radius r may be set to unity for beam forming direction feedback. This constraint implies that the center of the spherical cap is centered at the vector [1 0 0 0] (assuming 4 transmit antennas). In at least one implementation, the tracking codebook has 32 code words while the fine and coarse codebooks have 256 and 64, respectively. Other codebook sizes and size relationships may be used in other implementations.

Figure 8:
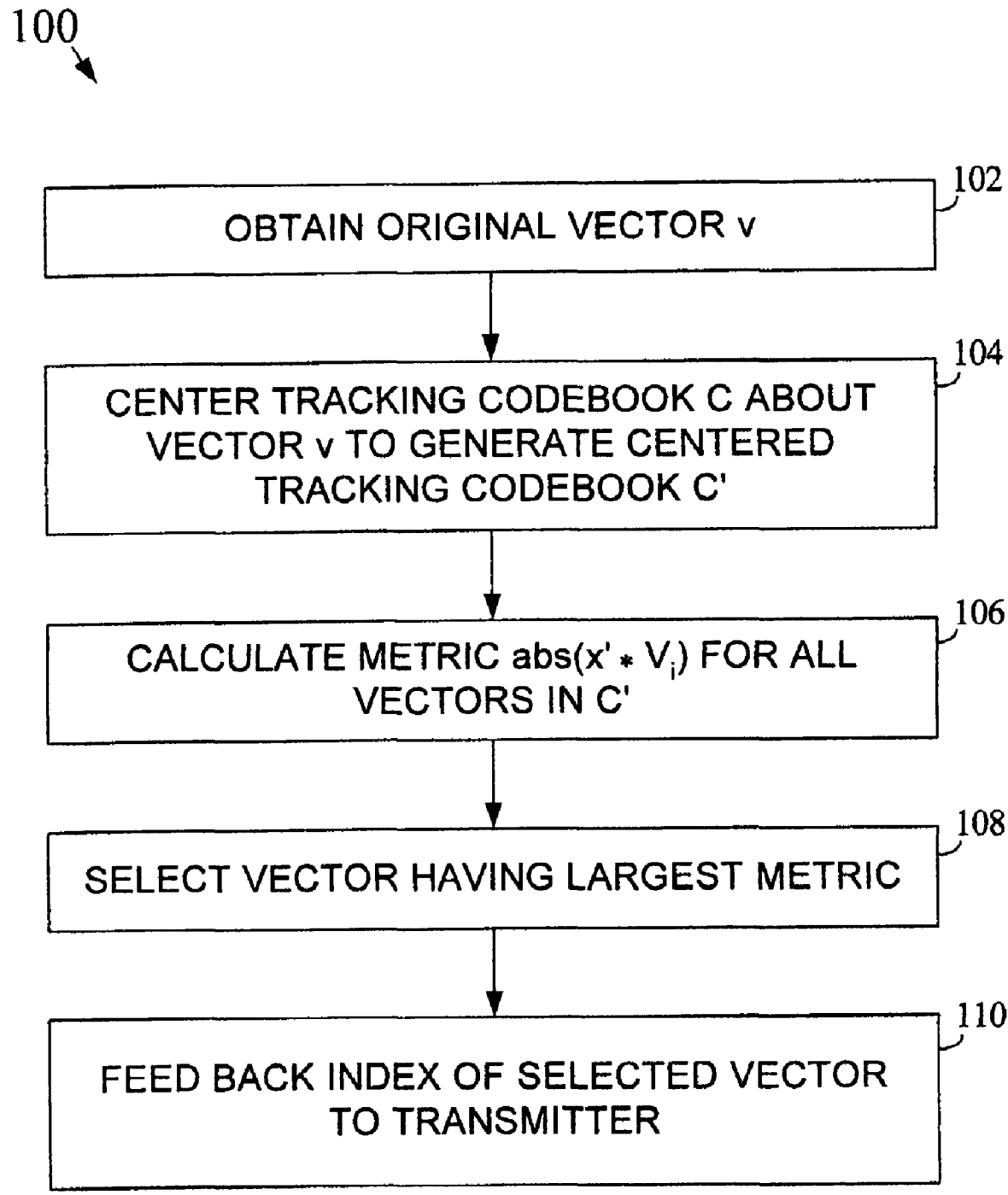
FIG. 8 is a flowchart illustrating an example method for using a tracking codebook to update channel related information in accordance with an embodiment of the present invention.

FIG. 8 is a flowchart illustrating an example method 100 for using a tracking code book within a subscriber station to update channel related information in accordance with an embodiment of the present invention. The quantized version of the previous input vector (i.e. v) is first computed by the subscriber station (block 102). The vector v is cumulatively computed from all the previous feedbacks as $v(t)=R(I_t)*v(t-1)$ for $t=1,\ldots,T$, where t is the time index; T is the time index of the previous feedback; $I_t$ is the feedback index at time t; $R(I_t)$ is a square orthogonal matrix determined by the tracking feedback $I_t$, $v(t)$ is the reconstructed beam forming vector for time t. $R(I_t)$ rotates $v(t-1)$ to $v(t)$. An orthogonal matrix is not necessarily square and it has orthogonal columns each of which has a unit norm. The computation for $R(I_1)$ using $I_t$ is known to both base station and subscriber station. There are multiple ways to compute $R(I_t)$ including, for example, Householder reflection. The vector may be obtained from, for example, a local memory within the subscriber station. The tracking codebook is then "centered" about the vector v to generate a centered tracking codebook C' (block 104). The tracking codebook may be centered by first finding the null space of v, denoted as W. The columns of W are not unique and the null space of v can be represented in multiple ways. The computation of W may be known by both the base station and subscriber station. A basis may then be formed as A=[vW]. The re-centered tracking codebook is then defined as C'=A*C, where C is the original tracking codebook centered at vector [1, 0, 0, 0] (assuming 4 transmit antennas). After the tracking codebook has been centered, a metric abs $(x'^*v_i)$ is next calculated for all of the vectors in the re-centered codebook C' (block 106). The vector having the largest metric is then selected (block 108). The index of the selected vector may then be fed back to the base station (block 110). The base station may then use the index to identify the corresponding vector. The base station may then use the vector to update the previous beam forming vector of the subscriber station. The updated beam forming vector may then be used to pre-code data for transmission to the subscriber station. The tracking quantization can be generalized from vector to matrix by replacing the word vector with matrix in the description above. The tracking codebook consists of matrix code words, which may center about $[1\ 0\ 0\ 0;\ 0\ 1\ 0\ 0]^T$ assuming four transmit antennas. The computation in block 106 is replaced by computing the distance between input matrix and each code word matrix in rotated codebook C'. Block 108 selects the code word matrix having the minimum distance.

At the base station, after channel related information has been received from each of the subscriber stations that are operating as MU-MIMO devices, the base station may select a given number of subscriber stations to be transmitted to simultaneously. In addition to the beam forming vectors (i.e., singular vectors) described earlier, the MU-MIMO subscriber stations may also feed back the corresponding singular values. These singular values act as channel quality indications (CQIs) that can be used to limit the subscriber stations that are considered for simultaneous transmission. In one approach, an initial set of subscriber stations having the highest CQI values is first selected in the base station. After this initial set has been isolated, the set is analyzed to identify subscriber stations having nearly orthogonal beam forming vectors.

Figure 9:
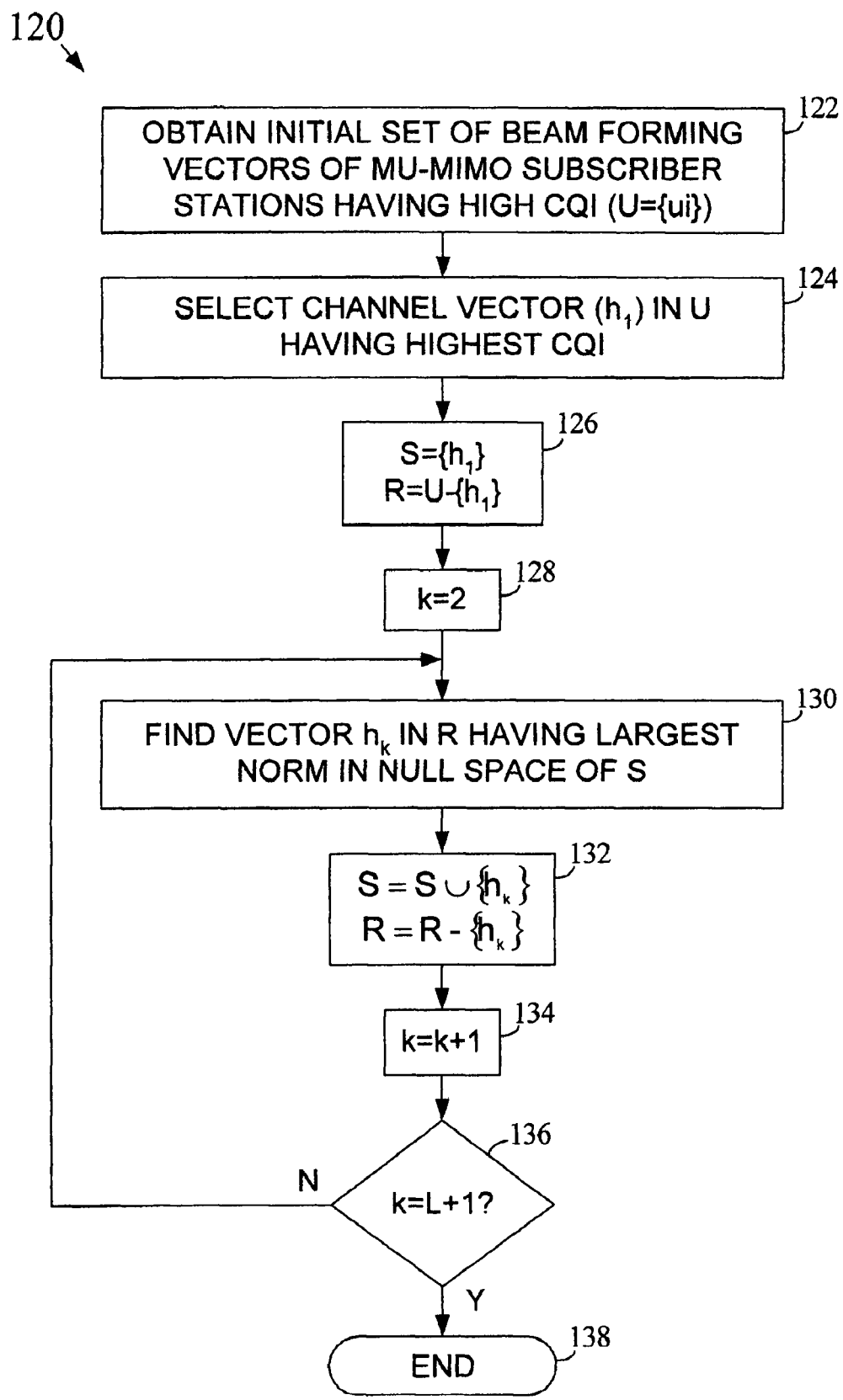
FIG. 9 is a flowchart illustrating an example method that may be used to find subscriber stations having nearly orthogonal beam forming vectors in accordance with an embodiment of the present invention.

FIG. 9 is a flowchart illustrating an example method 120 that may be used to select L MU-MIMO subscriber stations in a cell to be transmitted to simultaneously by a base station in accordance with an embodiment of the present invention. First, an initial set of beam forming vectors (U) is obtained that are associated with MU-MIMO subscriber stations that have the highest CQI values in the cell (block 122). The beam forming vector having the highest CQI in the set U is then selected as an initial beam forming vector $h_1$ (block 124). The vector $h_1$ is added to a set S and a set R is defined that includes all vectors in U other than $h_1$ (block 126). An index k, which is the index of the selected subscriber stations, is next initialized to 2 (block 128). A vector $h_2$ in R having a largest norm in the null space of S is next found (block 130). The vector $h_2$ is then added to set S and is removed from set R (block 132). The index k is then incremented by 1 (block 134).

It is next determined whether index k has reached a value of L+1, where L is the desired number of selected subscriber stations (block 136). If not (block 136-N), the method 120 returns to block 130 and finds a vector $h_3$ in R having the largest norm in the null space of S. The vector $h_3$ is then added to set S and removed from set R (block 132). The index k is then again incremented by 1 (block 134). This process then repeats until the value of index k equals L+1 (block 136-Y). At this time, L subscriber stations have been selected for use in simultaneous transmission. The method 120 then terminates (block 138).

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; and/or in other formats. In some embodiments, the methods described herein may be implemented as instructions stored on computer readable media. Examples of different types of computer readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the description above, terminology may be used that is typically associated with a particular wireless communication standard. It should be appreciated, however, that the inventive techniques and structures are not limited to use with any particular standard.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
at a base station supporting both multi-user multiple input multiple output (MU-MIMO) and single user multiple input multiple output (SU-MIMO) using a multi-resolution codebook comprising a first codebook and a second codebook, receiving first channel feedback from a first wireless device implementing said MU-MIMO, said first channel feedback describing a downlink channel from said base station to said first wireless device, wherein said first channel feedback is quantized using said first codebook;
pre-coding first data for transmission to said first wireless device, using said first channel feedback;
receiving second channel feedback at said base station from a second wireless device implementing said SU-MIMO, said second channel feedback describing a downlink channel from said base station to said second wireless device, wherein said second channel feedback is quantized using said second codebook, and said second codebook is smaller than, and a subset of, said first codebook; and
pre-coding second data for transmission to said second wireless device, using said second channel feedback.

2. The method of claim 1, wherein: p1 said first channel feedback includes an index of a code word from said first codebook that most nearly resembles a beam forming vector or matrix generated within said first wireless device; and
said second channel feedback includes an index of a code word within said second codebook that most nearly resembles a beam forming vector or matrix generated within said second wireless device.

3. The method of claim 1, further comprising:
receiving third channel feedback at said base station from said first wireless device implementing said MU-MIMO, said third channel feedback describing a difference between a previously received beam forming vector or matrix of said first wireless device and a more recent beam forming vector or matrix of said first wireless device, wherein said third channel feedback is quantized using a third codebook that includes a number of unit vectors or orthogonal matrixes on a cap of a sphere.

4. The method of claim 3, further comprising:
updating a beam forming vector or matrix associated with said first wireless device using said third channel feedback to generate an updated beam forming vector or matrix; and
pre-coding third data for transmission to said first wireless device using said updated beam forming vector or matrix.

5. The method of claim 3, wherein:
said cap of said sphere of said third codebook is centered about said previously received beam forming vector or matrix of said first wireless device.

6. An article comprising a non-transitory computer readable storage medium having instructions stored thereon that, when executed by a processor, operate to:
at a base station supporting both multi-user multiple input multiple output (MU-MIMO) and single user multiple input multiple output (SU-MIMO) using a multi-resolution codebook comprising a first codebook and a second codebook, receive first channel feedback from a first wireless device implementing said MU-MIMO, said first channel feedback describing a downlink channel from said base station to said first wireless device, wherein said first channel feedback is quantized using a first codebook;
pre-code first data for transmission to said first wireless device using said first channel feedback;
receive second channel feedback at said base station from a second wireless device implementing said SU-MIMO, said second channel feedback describing a downlink channel from said base station to said second wireless device, wherein said second channel feedback is quantized using said second codebook, and said second codebook is smaller than, and a subset of, said first codebook; and
pre-code second data for transmission to said second wireless device using said second channel feedback.

7. The article of claim 6, wherein:
said first channel feedback includes an index of a code word from said first codebook that most nearly resembles a beam forming vector or matrix generated within said first wireless device; and
said second channel feedback includes an index of a code word within said second codebook that most nearly resembles a beam forming vector or matrix generated within said second wireless device.

8. The article of claim 6, wherein said instructions further operate to:
receive third channel feedback from said first wireless device implementing said MU-MIMO, said third channel feedback describing a difference between a previously received beam forming vector or matrix of said first wireless device and a more recent beam forming vector or matrix of said first wireless device, wherein said third channel feedback is quantized using a third codebook that includes a number of unit vectors or orthogonal matrices on a cap of a sphere.

9. The article of claim 8, wherein said instructions further operate to:
update a beam forming vector or matrix associated with said first wireless device using said third channel feedback to generate an updated beam forming vector or matrix; and
pre-code third data for transmission to said first wireless device using said updated beam forming vector or matrix.

10. The article of claim 8, wherein:
said cap of said sphere associated with said third codebook is centered about said previously received beam forming vector or matrix of said first wireless device.

11. An apparatus comprising:
a wireless transceiver to receive signals from a multiple input multiple output (MIMO) channel and to transmit signals into said MIMO channel; and
a controller supporting both multi-user MIMO (MU-MIMO) and single user MIMO (SU-MIMO) using a multi-resolution codebook comprising a first codebook and a second codebook, configured to:
receive via said wireless transceiver, first channel feedback from a first wireless device implementing said MU-MIMO, said first channel feedback describing a downlink channel from a base station to said first wireless device, wherein said first channel feedback is quantized using said first codebook;
pre-code first data for transmission to said first wireless device via said wireless transceiver, using said first channel feedback;
receive, via said wireless transceiver, second channel feedback from a second wireless device implementing said SU-MIMO, said second channel feedback describing a downlink channel from said base station to said second wireless device, wherein said second channel feedback is quantized using said second codebook that is smaller than, and a subset of, said first codebook; and
pre-code second data for transmission to said second wireless device via said wireless transceiver, using said second channel feedback.

12. The apparatus of claim 11, wherein:
said first channel feedback includes an index of a code word from said first codebook that most nearly resembles a beam forming vector or matrix generated within said first wireless device; and
said second channel feedback includes an index of a code word within said second codebook that most nearly resembles a beam forming vector or matrix generated within said second wireless device.

13. The apparatus of claim 11, wherein said controller is further configured to:
receive third channel feedback from said first wireless device implementing said MU-MIMO, said third channel feedback describing a difference between a previously received beam forming vector or matrix of said first wireless device and a more recent beam forming vector or matrix of said first wireless device, wherein said third channel feedback is quantized using a third codebook that includes a number of unit vectors or orthogonal matrices on a cap of a sphere.

14. The apparatus of claim 13, wherein said controller is further configured to:
update a beam forming vector or matrix associated with said first wireless device using said third channel feedback to generate an updated beam forming vector or matrix; and
pre-code third data for transmission to said first wireless device using said updated beam forming vector or matrix.

15. The apparatus of claim 13, wherein:
said cap of said sphere associated with said third codebook is centered about said previously received beam forming vector or matrix of said first wireless device.

* * * * *

UNITED STATES PATENT AND TRADEMARK OFFICE
CERTIFICATE OF CORRECTION

| | |
|---|---|
| PATENT NO. | : 8,254,486 B2 |
| APPLICATION NO. | : 11/904867 |
| DATED | : August 28, 2012 |
| INVENTOR(S) | : Jun Shi et al. |

Page 1 of 1

It is certified that error appears in the above-identified patent and that said Letters Patent is hereby corrected as shown below:

In column 9, line 50, in claim 2, before "said" delete "p1".

In column 11, line 13, in claim 11, delete "receive" and insert -- receive, --, therefor.

Signed and Sealed this
Eighteenth Day of December, 2012

David J. Kappos
*Director of the United States Patent and Trademark Office*